(12) United States Patent
Kimura

(10) Patent No.: US 10,831,035 B2
(45) Date of Patent: Nov. 10, 2020

(54) OPTICAL ENCODER

(71) Applicant: Mitutoyo Corporation, Kanagawa (JP)

(72) Inventor: Akihide Kimura, Tokorozawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 1072 days.

(21) Appl. No.: 14/919,188

(22) Filed: Oct. 21, 2015

(65) Prior Publication Data

US 2016/0116757 A1    Apr. 28, 2016

(30) Foreign Application Priority Data

Oct. 23, 2014    (JP) .................................. 2014-216274

(51) Int. Cl.
*G02B 27/42* (2006.01)
*G01D 5/38* (2006.01)
*G01D 5/347* (2006.01)
*G02B 27/14* (2006.01)

(52) U.S. Cl.
CPC ..... *G02B 27/4238* (2013.01); *G01D 5/34707* (2013.01); *G01D 5/34746* (2013.01); *G01D 5/38* (2013.01); *G02B 27/144* (2013.01)

(58) Field of Classification Search
CPC .............. G02B 27/4238; G02B 27/144; G01D 5/34746; G01D 5/34707
See application file for complete search history.

(56) References Cited

U.S. PATENT DOCUMENTS 3,768,911 A * 10/1973 Erickson .................. G01D 5/38
356/619
4,636,076 A * 1/1987 Pettigrew ................. G01D 5/38
356/499
4,776,701 A    10/1988 Pettigrew
(Continued)

FOREIGN PATENT DOCUMENTS

JP    S60-41283 B2    9/1985
JP    S60-260813    12/1985
(Continued)

OTHER PUBLICATIONS

European Search Report dated Feb. 23, 2016.
Japanese Decision to Grant with English Translation dated Aug. 7, 2018, 6 pages.

*Primary Examiner* — Georgia Y Epps
*Assistant Examiner* — Don J Williams
(74) *Attorney, Agent, or Firm* — Rankin, Hill & Clark LLP

(57) ABSTRACT

An optical encoder 10 comprising: a light source 11; a splitter 12 splits a light from the light source 11, a light receiving unit 16; a scale 13 is arranged on a light path and movable in a measurement direction, a grating being arranged on a main surface of the scale; and an offset diffraction grating 14 includes a plurality of diffraction gratings arranged in the optical path from the splitter 12 to the light receiving unit 16, the plurality of diffraction gratings diffracting the split lights with different phases, wherein, the plurality of diffraction gratings 13 in the offset diffraction grating 14 are arranged in one plane parallel to the main surface of the scale and are offset each other in an offset direction orthogonal to the measurement direction, the light receiving unit 16 includes a plurality of light-receiving elements 16-11 to 16-23 arranged in the offset direction.

9 Claims, 13 Drawing Sheets

(56) References Cited

U.S. PATENT DOCUMENTS

| | | | |
|---|---|---|---|
| 5,009,506 A * | 4/1991 | Spies | G01D 5/38 250/237 G |
| 5,214,280 A * | 5/1993 | Rieder | G01D 5/38 250/231.16 |
| 5,450,199 A | 9/1995 | Rieder | |
| 5,486,923 A | 1/1996 | Mitchell et al. | |
| 5,574,559 A | 11/1996 | Kaneda et al. | |
| 5,886,964 A | 3/1999 | Fujita | |
| 6,577,401 B1 * | 6/2003 | Matsumoto | G01D 5/38 356/499 |
| 8,804,131 B2 | 8/2014 | Holzapfel | |
| 2001/0006421 A1 | 7/2001 | Parriaux | |
| 2004/0090637 A1 | 5/2004 | Holzapfel et al. | |
| 2008/0062432 A1 | 3/2008 | Sandig et al. | |
| 2009/0257066 A1 | 10/2009 | Tamiya et al. | |
| 2010/0208271 A1 * | 8/2010 | Ishizuka | G01D 5/2457 356/499 |
| 2012/0154780 A1 * | 6/2012 | Demarest | G01D 5/24476 355/72 |
| 2012/0292493 A1 * | 11/2012 | Hermann | G01D 5/366 250/231.1 |

FOREIGN PATENT DOCUMENTS

| | | |
|---|---|---|
| JP | S62-48167 B2 | 10/1987 |
| JP | H1-30088 B2 | 6/1989 |
| JP | H1-276020 | 11/1989 |
| JP | H4-291103 A | 10/1992 |
| JP | H5-126604 A | 5/1993 |
| JP | H6-5326 | 1/1994 |
| JP | H6-5327 | 1/1994 |
| JP | H6-201327 | 7/1994 |
| JP | H6-103194 B2 | 12/1994 |
| JP | H9-81942 A | 3/1997 |
| JP | H10-501334 | 2/1998 |
| JP | 2000-304507 A | 11/2000 |
| JP | 2002-350191 | 12/2002 |
| JP | 2004-28776 | 1/2004 |
| JP | 2004-69702 | 3/2004 |
| JP | 2009-257841 | 11/2009 |
| JP | 2013-546001 A | 12/2013 |
| WO | 00/11431 | 3/2000 |

* cited by examiner

OPTICAL ENCODER

INCORPORATION BY REFERENCE

This application is based upon and claims the benefit of priority from Japanese patent application No. 2014-216274, filed on Oct. 23, 2014, the disclosure of which is incorporated herein in its entirety by reference.

BACKGROUND OF THE INVENTION

1. Field of the Invention

The present invention relates to an optical encoder.

2. Description of Related Art

Currently, one of the apparatus for measuring the amount of movement is an optical linear encoder. The optical linear encoder includes a scale and a detection head which moves along the scale, and measures the movement of the number of the main signals for the interference fringes from the start of the measurement position by reading the changes in the brightness of the main signal interference fringes when the detection head is moved along the scale.

In this optical linear encoder, how to improve high resolution so as to enhance high precision measurement has been studied. For example, it has been considered that scale marks of a fine-pitch of 1 μm or less can be formed on the scale of the optical linear encoder as a diffraction grating (in order) to detect the relative displacement with high accuracy. Such an optical linear encoder is roughly classified into the following four types of methods in which it is used.

(1) An Optical System Using a Polarization Beam Splitter and Non-Polarization Beam Splitter.

As a method (1), Japanese Unexamined Patent Application Publication No. 6-5326, Japanese Unexamined Patent Application Publication No. 6-5327, and Japanese Unexamined Patent Application Publication No. 2009-257841 are disclosed. An example of this method is described with reference to FIG. 9

In a grating interference type displacement detection apparatus 50 in FIG. 9, the laser beam emitted from a laser light source 51 is split into two waves in accordance with a polarization direction of a polarizing beam splitter 52. Split luminous beams A and B are incident on two different diffraction points P1 and P2 on a scale 54 where a diffraction grating 53 of the transmission type is formed along the measurement direction. First-order diffracted lights A1 and B1 of the split light beams A and B in the diffraction points P1 and P2 are generated, respectively, and are incident on a non-polarization beam splitter 55. Each of these first-order diffracted lights A1 and B1 are collected in one point on the non-polarization beam splitter 55 and are synthesized, and as a result synthetic waves MA and MB are formed.

The polarization directions of the synthetic wave MA are matched by a polarizing plate 57A so that the synthetic wave MA becomes interfering light. Then, the interfering light is converted into an electric signal in a light receiving element 58A. The polarization directions of the synthesizing wave MB are matched so that the synthesizing wave MB becomes the interfering light after only one polarization component of the synthesizing wave MB is delayed by 90 degrees in the light receiving element 58A. And the interfering light is converted into an electric signal in a light receiving element 58B.

In the method (1), the cost increases, because it requires a lot of expensive optical components, such as a beam splitter used for splitting or synthesizing light, and a wave plate or a polarizing plate for generating a phase difference between interfering signals.

(2) An Optical System Using a Diffraction Grating

As a method (2), Japanese Unexamined Patent Application Publication No. 60-260813 and Japanese Unexamined Patent Application Publication No. 1-276020, Japanese Unexamined Patent Application Publication No. 2004-69702 are disclosed. An example of this method is described with reference to FIG. 10.

In FIG. 10, a light beam emitted from a light source, an index grating 61 is split in the light beam traveling in straight line (zero-order diffraction) and first-order diffracted light beams. The first-order diffracted light beam has a phase $\Psi$ with respect to the light beam traveling in straight line.

The light beam traveling in a straight line is diffracted by a scale grating 62 and becomes a light beam having a phase $\Omega$. The diffracted light beam is diffracted by the scale grating 62 and becomes a light beam having a phase $\Psi+\Omega$.

In an index grating 63, one of the light beams having the phase $\Omega$ and the light beam having the phase $\Psi+\Omega$ is diffracted and a phase $\Psi$ is added thereto, the other of the light beams travels in straight line, and both light beams are synthesized.

Thus, in the method (2), the phase grating is used as the index grating in order to create a plurality of interfering signals having a predetermined phase difference. It is necessary that the grating groove depth and the grating duty ratio of the phase grating are specially designed.

Therefore, in the method (2), when refining the grating pitch of the scale, it is also necessary to refine the pitch of the index grating. However, it is difficult to manufacture the index grating, because it is necessary to refine the index grating while the duty ratio of the index grating is also relatively kept constant.

(3) An Optical System Using the Diffraction Grating with a Physical Offset in the Measurement Direction As a method (3), Japanese Unexamined Patent Application Publication No. 6-201327, U.S. Pat. No. 5,214,280, Japanese Unexamined Patent Application Publication No. 2004-28776 are disclosed. An example of this method is described with reference to FIG. 11.

In FIG. 11, a divergent light beam emitted from a light emitting element 71 is diffracted by a mirror 72, is caused to be a parallel light beam by a lens 73, is incident on a first diffraction grating 74, is transmission-diffracted by the first diffraction grating 74, and is reflectively diffracted by a diffraction grating 75 on the scale. The diffracted lights that is synthesized by a third diffraction grating 76 in a manner that the optical paths thereof are superimposed each other becomes a interfering light beam and the interfering light and is incident on light receiving devices 77A, 77B, 77C, and 77D.

In such method (3), a configuration that is substantially the same as that of the above-mentioned method (2) is used as a configuration for splitting and synthesizing of light waves, and the diffraction grating is used with a physical offset in the measurement direction as a configuration used for generating a plurality of interfering signals having the predetermined phase differences.

Thus in the method (3), unlike in the method (2), there is no limitation in the grating type (an amplitude grating/a phase grating) and it is not necessary to design the grating parameters (the grating groove depth and the grating duty ratio) to provide the predetermined phase difference with the interference signal. In this regard, the method (3) can be relatively easily applied to a grating interference encoder.

Meanwhile, in the method (3), the configuration each of the plurality of interfering signals having the predetermined phase differences is obtained from a different position on the scale is employed. Therefore, a change arises in only the interfering signal received by the light receiving device 77C when there is a local defect represented by 78 on the diffraction grating 75 on the scale as shown in FIG. 12. As a result, a balance of strength of the interfering signals is lost and thus the accuracy of detection of a position is likely to deteriorate.

(4) An Optical System Detecting Interference Fringes by the Light-Receiving Device Array In a method (4), interference fringes of the two light beams are generated by using an optical element and the scale, and the interference fringes are detected by the light-receiving device array. This method is disclosed in Japanese Unexamined Patent Application Publication No. 2002-350191. An example of this method is described with reference to FIG. 13.

In FIG. 13, a coherent light, which is collimated by a laser diode 81 and lens 82, is emitted. Then, two light beams 84 and 85 diffracted by the grating are incident on a grating 86 in a wave front correction structure 83.

After the two light beams diffracted by the grating 86, the resulting interference pattern is detected by a detector 87.

There is no need to design the parameters of the grating for limitation of the index form and for obtaining the predetermined phase difference between the interfering signals, because the configuration in the method (4) is simple. Further, even if there is a defect in a part of the grating of the scale, a major change in only a specific interference signal is unlikely to occur, because the array structure of the light-receiving device in the method (4) has the effect of averaging the intensity of the received light.

However, in the method (4), strong correlation between the pitch of interference fringes and the pitch of the light-receiving device array is needed to detect the correct signal. Because of this correlation, the measurement accuracy deteriorates when the interference fringes are disturbed for some reasons. For example, a shape error of the optical element (in the case of FIG. 12, the wave front correction structure 79) and a plane swell that exists on the scale correspond to causes of the interference fringe disturbance.

Moreover, as the scale pitch becomes finer, these tolerances become stricter, and thus this configuration is difficult to be applied to the grating-interference-type optical encoder. Also, although it is necessary to shorten the array pitch of the detectors 87, there is a problem that it is difficult to manufacture a detector having short array pitch.

SUMMARY OF THE INVENTION

Thus, in the conventional optical encoder, there is a problem, that it is difficult to satisfy all the requirements regarding the number of parts, constraint of the diffraction grating, the effect of scale defects, and miniaturization.

The object of the present invention is to provide an optical encoder that satisfies all the requirements regarding the number of parts, constraint of the diffraction grating, the effect of scale defects, and miniaturization.

The optical encoder according to a first aspect of the present invention comprising: a light source; a splitting means for splitting the light from said light source, a light receiving unit; a scale including a grating on main surface of the scale, arranging in an optical path, and being movable in the measurement direction; and an offset diffraction grating includes a plurality of diffraction gratings arranged in the optical path from said splitting unit to said light receiving unit, for diffracting the split lights at t phases different from each other; characterized in that; said plurality of diffraction gratings in said offset diffraction grating are arranged in one plane parallel to the major surface of the scale, and are offset from each other in a direction orthogonal to the measurement direction; said light receiving unit includes a plurality of light-receiving elements arranged in an offset direction.

The optical encoder according to a second aspect of the present invention characterized in that said splitting means is a first non-polarization beam splitter, and said optical encoder comprises a second non-polarization beam splitter arranged in the optical path from said scale to said light receiving unit.

The optical encoder is a third aspect of the present invention characterized in that said offset diffraction grating optical encoder is arranged in the optical path from said scale to said second non-polarization beam splitter.

The optical encoder according to a fourth aspect of the present invention characterized in that said offset diffraction grating optical encoder is arranged in the optical path from said first non-polarization beam splitter to said scale.

The optical encoder according to a fifth aspect of the present invention characterized in that said splitting means is an index grating.

The optical encoder according to a sixth aspect of the present invention characterized in that said offset diffraction grating optical encoder is arranged in the optical path from said scale to the site of said index grating for emitting light to the light receiving unit.

The optical encoder according to a seventh aspect of the present invention characterized in that said offset diffraction grating is arranged in the optical path from the site of said index grating that light from said light source is incident on, to said scale.

The optical encoder according to the eighth aspect of the present invention characterized in that said scale reflects light.

The optical encoder according to a ninth aspect of the present invention characterized in that said light receiving unit has a plurality of rows in which a plurality of light receiving elements are arranged in an offset direction.

According to the present invention, the number of parts, constraint of the diffraction grating, the influence of scale defects, it is possible to provide an optical encoder that can meet all the requirements for miniaturization.

The above and other objects, features and advantages of the present invention will become more fully understood from the detailed description given herein below and the accompanying drawings which are given by way of illustration only, and thus are not to be considered as limiting the present invention.

DESCRIPTION OF THE EXEMPLARY EMBODIMENTS

First Embodiment

Figure 1:
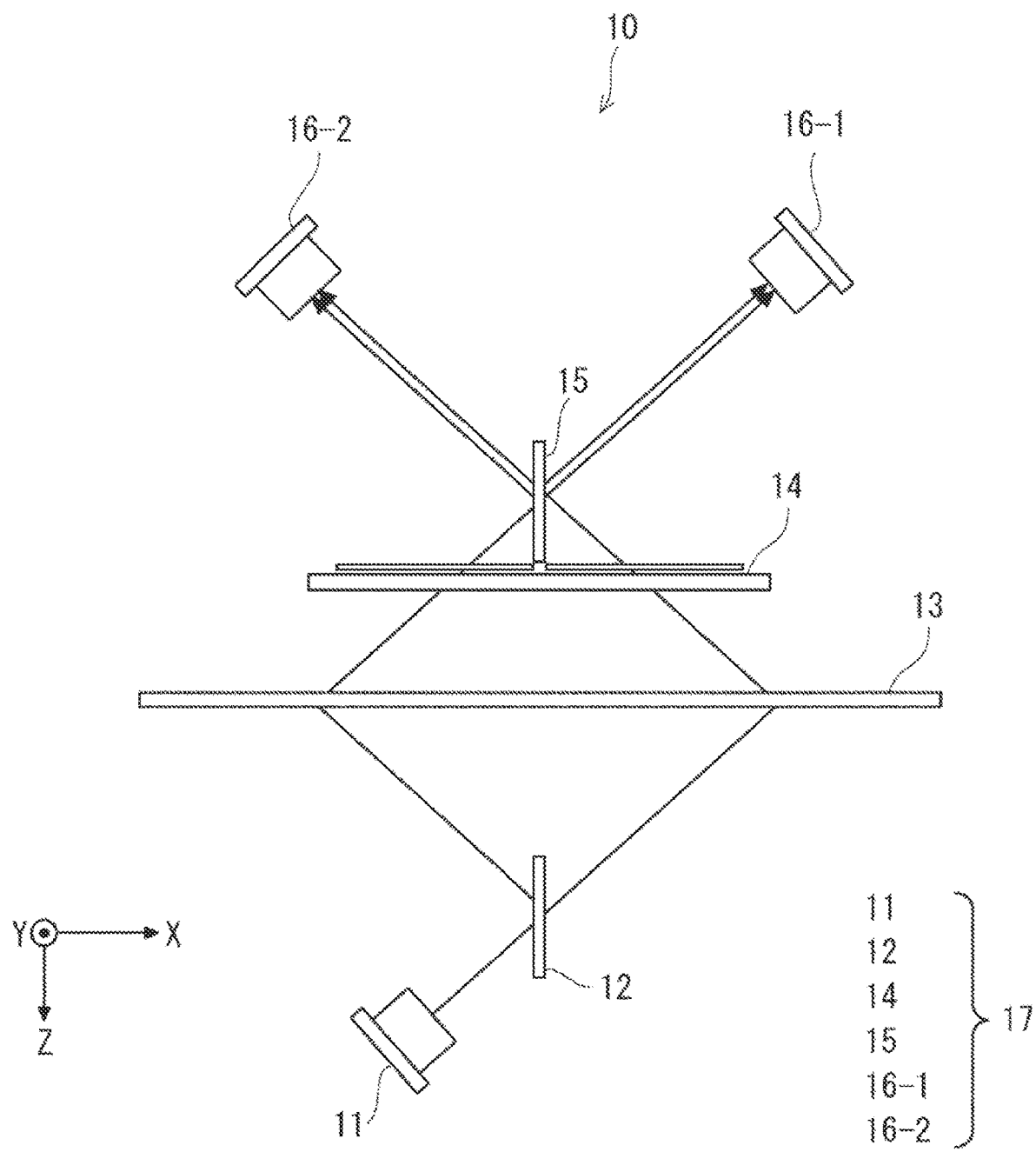
FIG. 1 is a top view showing an outline of an optical portion of the optical encoder according to the first embodiment.

The following describes an optical encoder according to a first embodiment of the present invention with reference to the drawings. FIG. 1 is a top view showing an outline of an optical portion of the optical encoder according to the first embodiment.

In FIG. 1, an optical encoder 10 includes a light source 11, a non-polarization beam splitter 12 (also referred to as a splitter 12), a scale 13, an offset diffraction grating 14, a non-polarization beam splitter 15, and light receiving units 16-1 and 16-2. In the optical encoder 10, a detection head 17 includes the light source 11, the non-polarization beam splitter 12, the offset diffraction grating 14, the non-polarization beam splitter 15, and the light receiving units 16-1 and 16-2, and measures the amount of displacement of the detection head 17 relatively moving in an X-axis direction along the scale 13.

The light source 11 is configured to emit a light in the direction of the non-polarization beam splitter 12. Specifically, the light source 11 which is configured to emit a light beam, for example, a LED (Light Emitting Diode), a semiconductor laser, an SLED (Self-Scanning Light Emitting Device), or an OLED (Organic light-emitting diode), can be used.

The non-polarization beam splitter 12 is a splitting means (splitter) for splitting the light beam emitted from the light source 11 into two light beams. Generally, the non-polarization beam splitter 12 causes two light beams to reach the scale 13 in phase. For example, the non-polarization beam splitter 12 is arranged in a plane perpendicular to the scale 13 and the light source 11 is arranged so that the light beam from the light source 11 is incident on the main surface of the non-polarization beam splitter 12 from an oblique direction, and thereby two light beams reach the scale 13 thorough equal distances.

One or more diffraction gratings are arranged in parallel on the main surface of the scale 13. The scale 13 can be moved parallel to the measurement direction. The pattern of the diffraction grating of the scale 13 is preferably linear projections and depressions that are configured side by side in parallel with pitches of micrometer size. Moreover, any material capable of forming a grating-like light transparent portion which transmits light and a grating-like light non-transparent portion that does not transmit light can be applied to the scale 13.

The offset diffraction grating 14 in which a plurality of diffraction grating patterns are arranged in parallel on one side of the main surface of the scale 13 diffracts each of the split lights by the plurality of diffraction grating patterns. In the offset diffraction grating 14, since the plurality of diffraction grating patterns are arranged on the same plane and it has an offset in a direction orthogonal to the measurement direction between the diffraction grating patterns, the light beams diffracted in the respective diffraction grating patterns have different phases from each other.

Figure 2:
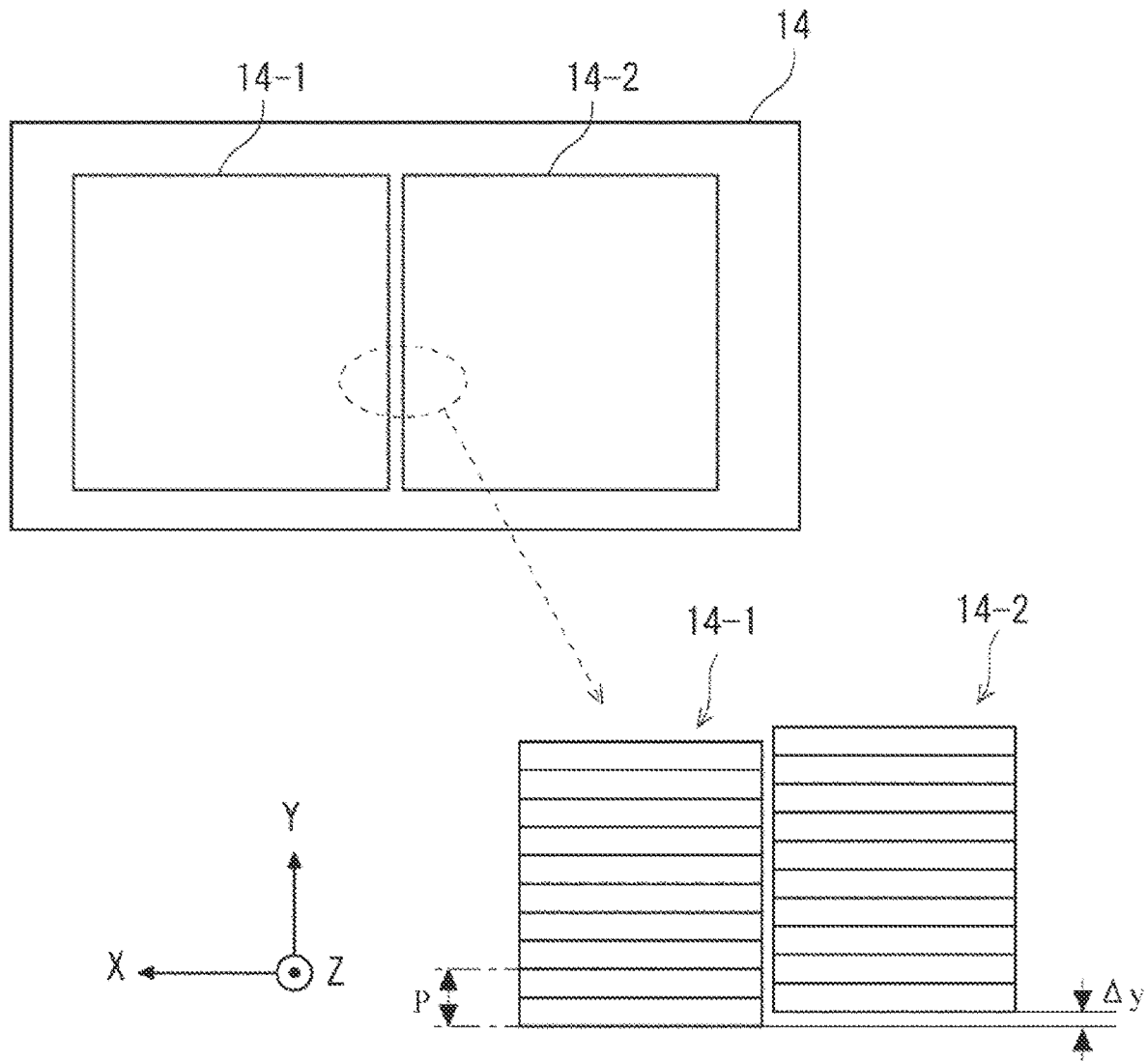
FIG. 2 is a diagram showing the configuration of an offset diffraction grating according to the first embodiment.

The-polarization beam splitter 15 synthesizes the lights diffracted in the offset diffraction grating 14 and emits the synthesized light to the light receiving units 16-1 and 16-2. For example, the non-polarization beam splitter 15 is arranged on the symmetry plane to which diffracted light diffracted by a grating area 14-1 and the diffracted light diffracted by a grating area 14-2 are plane-symmetrical as shown in FIG. 2.

Figure 3:
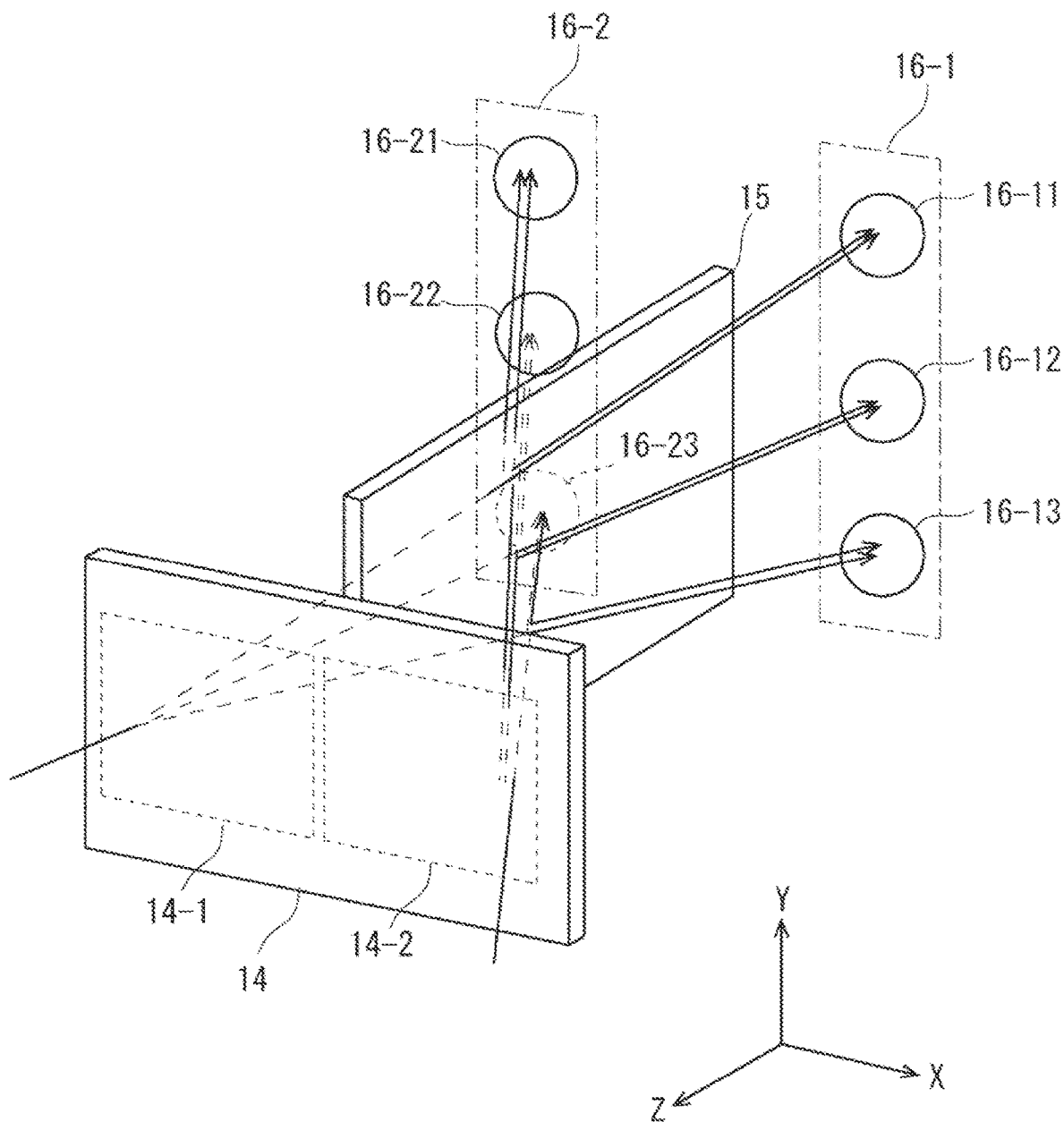
FIG. 3 is a perspective view showing the outline of a portion of the optical encoder according to the first embodiment.

As shown in FIG. 3, the light receiving unit 16-1 has a configuration in which a plurality of light receiving elements 16-11, 16-12 and 16-13 are arranged in the offset direction. Also, the light receiving unit 16-2 has a configuration in which a plurality of light receiving elements 16-21, 16-22 and 16-23 are arranged in the offset direction as well as the light receiving unit 16-1.

That is to say, the receiving units 16-1 and 16-2 can obtain a plurality of interfering signals having phase differences as electric signals by converting the intensity of light obtained by synthesizing the light beams that are diffracted by each of the diffraction gratings of the offset diffraction grating 14 and have the different phases into the electrical signals.

The light receiving units 16-1 and 16-2 preferably include a photodiode array. Further, any of a phototransistor, a photoresistor, and so on can be applied as far as the unit can receive the light and convert it into the electrical signal.

Now, the offset diffraction grating as a feature of the present embodiment will be described. FIG. 2 is a diagram showing the configuration of an offset diffraction grating according to the first embodiment. In FIG. 2, the offset diffraction grating 14 has a grating area 14-1 and a grating area 14-2.

The grating area 14-1 and the grating area 14-2 have diffraction gratings formed in a direction perpendicular to the diffraction grating of the scale 13. There are an offset in a direction orthogonal to the measurement direction, i.e. in a Y-axis direction, between the grating pattern of the grating area 14-1 and the grating pattern of the grating area 14-2. The offset amount may be any amount which causes the phase difference between the light beams diffracted in each grating area.

For example, when the grating pitch is p and the offset amount $\Delta y$ is p/4, the phase difference between the light beams is 90°. Since the phase difference between the light beams may not be 0°, the phase difference between the light beams occurs when the offset amount is not equal to an integral multiple of the grating pitch.

The present embodiment is characterized in that the phase difference is generated between light beams by the offset diffraction grating, and further a plurality of interfering signals are generated by using a three-dimensional optical path. Next, the generation of the interfering signal will be described.

FIG. 3 is a perspective view showing an outline of a portion of the optical encoder according to the first embodiment. The same configurations as those of FIG. 1 will be indicated by the same numbers and description of those will be omitted.

FIG. 3 shows a portion of a subsequent stage of the offset diffraction grating 14 in the optical encoder 10 of FIG. 1. The light beam of the light source 11 is split into two beams in the non-polarization beam splitter 12.

Then, the two light beams are diffracted +1 order or −1 order in the scale 13, respectively, and are incident on the offset diffraction grating 14. Specifically, +1 order diffracted light is incident on the grating area 14-1 of the offset diffraction grating 14, and −1 order diffracted light is incident on the grating area 14-2 of the offset diffraction grating 14.

Here, the +1 order diffracted light after diffraction at the scale 13 is expressed by a following equation (1), and the −1 order diffracted light after diffraction at the scale 13 is expressed by a following equation (2).

$$U_{X+1} = \exp\left(i \cdot 2\pi \frac{x}{g}\right) \quad (1)$$

$$U_{X-1} = \exp\left(-i \cdot 2\pi \frac{x}{g}\right) \quad (2)$$

g represents the grating pitch of the scale 13, and x represents a position of the scale. In addition, the subscript of U represents diffraction. For example, $U_{x+1}$ means the +1 order diffracted light of the X-axis (measurement) direction in FIGS. 1 to 3, and $U_{x-1}$ means the −1 order diffracted light of the X-axis (measurement) direction in FIGS. 1 to 3.

The +1 order diffracted light is turned into zero-order, +1 order, and −1 order diffracted lights by the grid pattern of the grating area 14-1. Similarly, the −1 order diffracted light is turned into zero-order, order +1, and −1 order diffracted lights by the grid pattern of the grating area 14-2.

The resulting diffracted lights are expressed by equations (3) to (8).

$$U_{X+1,Y+1} = \exp\left(i \cdot 2\pi \frac{x}{g} + i \cdot 2\pi \frac{y+\Delta y}{p}\right) \quad (3)$$

$$U_{X-1,Y+1} = \exp\left(-i \cdot 2\pi \frac{x}{g} + i \cdot 2\pi \frac{y}{p}\right) \quad (4)$$

$$U_{X+1,Y0} = \exp\left(i \cdot 2\pi \frac{x}{g}\right) \quad (5)$$

$$U_{X-1,Y0} = \exp\left(-i \cdot 2\pi \frac{x}{g}\right) \quad (6)$$

$$U_{X+1,Y-1} = \exp\left(i \cdot 2\pi \frac{x}{g} - i \cdot 2\pi \frac{y+\Delta y}{p}\right) \quad (7)$$

$$U_{X+1,Y-1} = \exp\left(-i \cdot 2\pi \frac{x}{g} - i \cdot 2\pi \frac{y}{p}\right) \quad (8)$$

g represents the grating pitch of the scale, p represents the grating pitch of the diffraction grating offset, and y represents the position of the offset diffraction grating. In addition, the subscript of U represents diffraction. For example, $U_{y+1}$ means the +1 order diffracted light in the Y-axis direction in FIGS. 1 to 3, and $U_{y-1}$ means the −1 order diffracted light in the Y-axis direction in FIGS. 1 to 3.

For example, $U_{x+1, y+1}$ means +1 order diffraction at the scale 13 and +1 order diffraction at the offset diffraction grating 14.

Also, Δy represents the offset amount in the Y-axis direction between the grating areas in the offset diffraction grating 14 as described above. That is to say, when the grating area 14-1 has an offset of Δy in the Y-axis direction on the basis of the grating area 14-2, as shown in the equation (3), (7), the phase shift is caused by the offset amount Δy in the +1 order diffraction and −1 order diffraction light at the grating area 14-1. Note that the zero order diffracted light of the grating area 14-1 is not a diffractive light but instead a straight light, and the phase shift is not generated by the offset amount Δy as shown in Equation (5).

Then, as shown in equations (4), (6), (8), in the −1 order diffracted light, the 0 order diffracted light, and +1 order diffraction light, the phase shift is not caused by the offset amount Δy at the grating area 14-2.

Thus, in the encoder of the present embodiment, since the phase shift among the grating areas having an offset in the direction orthogonal to the measurement direction is caused by the offset amount Δy in the diffracted light, there is no need to use a wave plate or a polarizing plate.

Moreover, only the offset amount Δy is important in principle for the offset diffraction grating, and there is no need to design the grating parameter for providing the predetermined phase difference in the interfering signal.

Further, in this configuration, a plurality of interfering signals having the phase differences are obtained from the interference wave as a synthetic wave of UX+1 and the UX−1 at the offset diffraction grating 14. Therefore, since the effect of scale defects is generated similarly in all of the signals, change in the particular interfering signal never occurs.

Next, the interfering light synthesized by the non-polarization beam splitter after being diffracted by the offset diffraction grating will be described.

The respective diffracted light diffracted by the grating areas 14-1 and the respective diffracted light diffracted by the grating area 14-2 are synthesized into the interfering light at the non-polarization beam splitter 15. Specifically, the light that is +1-order-diffracted by the grating area 14-1, and the light that is +1-order diffracted by the grating area 14-2 are synthesized. Then, the light which is zero-order-diffracted by the grating area 14-1, and the light which is zero-order-diffracted by the grating area 14-2 are synthesized. Also the light id −1-order diffracted by the grating area 14-1 and a light that is −1-order diffracted by the grating area 14-2 are synthesized.

The intensities of the synthesized light are respectively converted to an electric signal at the light receiving elements of the light receiving units 16-1 and 16-2. Specifically, in FIG. 3, the light receiving elements 16-11 and 16-21 receive the interfering light generated by that synthesizing the lights +1-order-diffracted in the grating area 14-1 and grating area 14-2. Then, the light receiving elements 16-12 and 16-22 receives the interfering light generated by synthesizing the lights zero-order diffracted in the grating areas 14-1 and grating area 14-2. In addition, the light-receiving elements 16-13 and 16-23 receive the interfering light generated by synthesizing the lights −1-order-diffractedin the grating area 14-1 and grating area 14-2.

Here, the intensity of the interfering light received at the light receiving elements 16-11 is defined as $I_{A1}$, the intensity of the interfering light received at the light-receiving elements 16-12 is defined as $I_{A2}$, the intensity of the interfering light received at light receiving elements 16-13 is defined as $I_{A3}$, similarly the intensity of the interfering light received at the light receiving elements 16-21 is defined as $I_{B1}$, the intensity of the interfering light received at the light receiving elements 16-22 is defined as $I_{B2}$, and the intensity of the interfering light received at light receiving elements 16-23 is defined as $I_{B3}$. The intensities of the interfering lights are expressed by the following Equations (9), (10), and (11), respectively.

$$I_{A1} = I_{B1} = |U_{X+1,Y+1} + U_{X-1,Y+1}| = 2\left[1 + \cos\left\{2\pi\left(\frac{2x}{g} + \frac{\Delta y}{p}\right)\right\}\right] \quad (9)$$

$$I_{A2} = I_{B2} = |U_{X+1,Y0} + U_{X-1,Y0}| = 2\left[1 + \cos\left(2\pi \cdot \frac{2x}{g}\right)\right] \quad (10)$$

$$I_{A3} = I_{B3} = |U_{X+1,Y+1} + U_{X-1,Y+1}| = 2\left[1 + \cos\left\{2\pi\left(\frac{2x}{g} - \frac{\Delta y}{p}\right)\right\}\right] \quad (11)$$

As shown in Equation (10), the interfering light of the 0 order diffracted light has no phase shift due to the offset amount $\Delta y$ of offset diffraction grating. Meanwhile, as shown in Equations (9) and (11), the interfering lights of the first order diffracted light have the phase shift due to the offset amount $\Delta y$ of offset diffraction grating.

Thus, the optical encoder of the present embodiment can obtained the interfering light having no phase shift and the interfering light having the phase shift.

The amount of the phase shift can be determined by the offset amount $\Delta y$ between the diffraction gratings in the offset diffraction grating.

For example, when the $\Delta y=p/8$, since the difference of 90° between the $I_{A1}$ and $I_{A3}$ is caused, it is possible to output a phase A and a phase B as in the prior art. In this case, $I_{A2}$ is not needed. Also, when the $\Delta y=p/4$, since the difference of 90° between the $I_{A1}$ and $I_{A2}$ is caused, and it is possible to output the phase A and the phase B phase as in the prior art. In this case, $I_{A3}$ is not needed.

Also, a suitable signal processing method may also cause the phase difference of 120° between the interfering signals $I_{A1}$, $I_{A2}$, and $I_{A3}$ by establishing $\Delta y=p/3$ and may convert into a differential signal having the phase difference of 90° with a known method.

Then, the amount of change in the displacement x associated with the movement of the scale 13 is obtained from these interfering signals. The processing of these interfering signals can be implemented by calculation processing of analog or digital electrical signals.

Arithmetic processing after converting the interfering signals into the electrical signals can be implemented by CPU (Central Processing Unit) or ASIC (Application Specific Integrated Circuit) internal or external to the encoder and executing a predetermined arithmetic processing. Also, it may be implemented by connecting to the external computer and processing the arithmetic processing as software.

Thus, the optical encoder of the first embodiment can obtain a plurality of interfering signals having the phase difference by offsetting a plurality of diffraction gratings in the direction orthogonal to the measurement direction from each other and by individually measuring diffraction light in the offset direction without using the wave plate and a polarizing plate.

Moreover, the optical encoder of the first embodiment can be easily miniaturized because the diffraction grating has no limitation other than setting an offset in a direction orthogonal to the measurement direction. Also the optical encoder of the first embodiment has no variation among the interfering signals due to the effect of scale defects because the defects of the scale affect all the plurality of interfering signals.

The position in which the offset diffraction grating is arranged may be any position where the optical path of each beam is split. In the present embodiment, the splitter 15 is arranged in the optical path between the non-polarization beam splitter 12 and the non-polarization beam.

Figure 4:
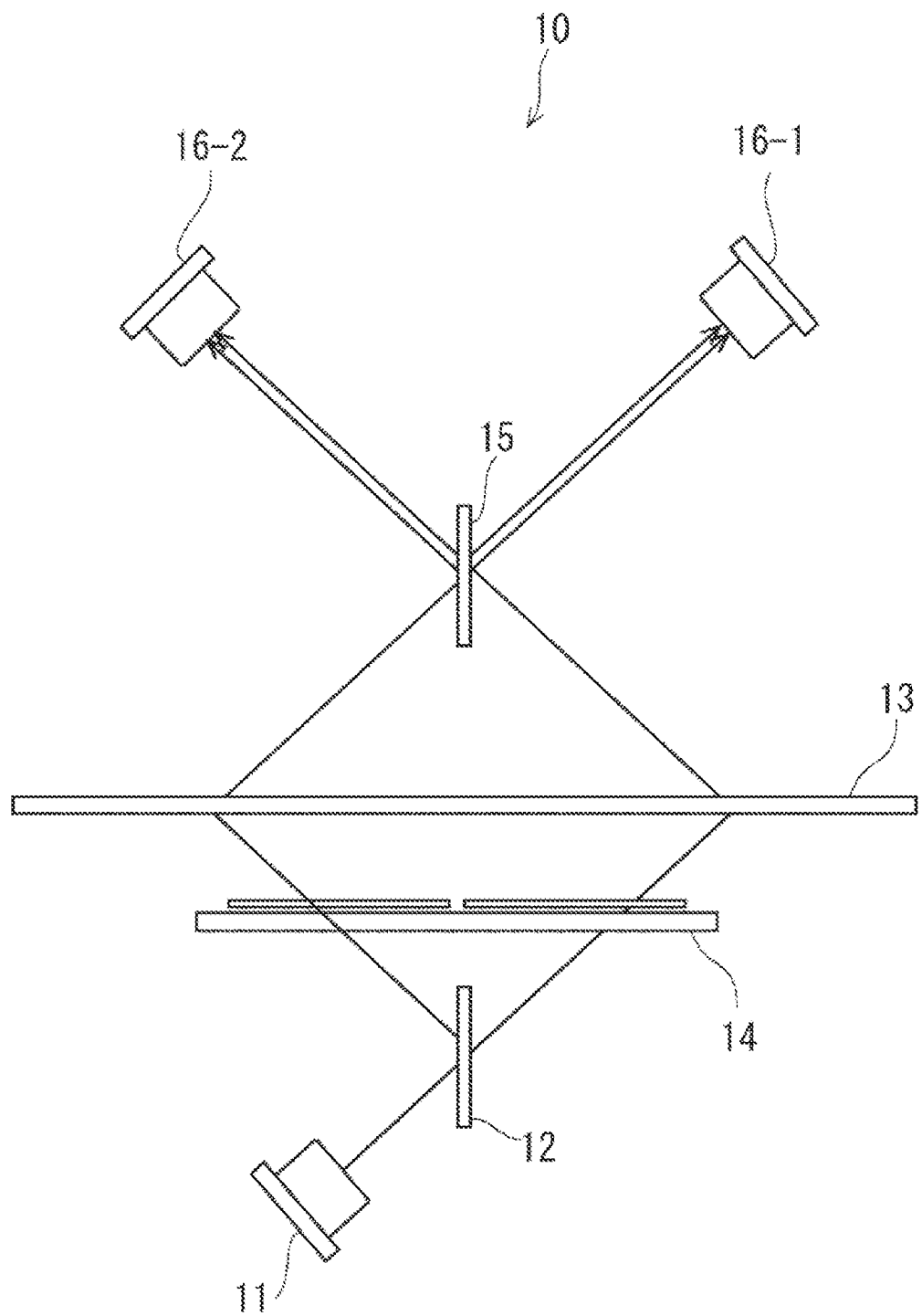
FIG. 4 is a top view schematically showing the optical portion of the optical encoder according to the first embodiment.

In the optical encoder of FIG. 1, although the offset diffraction grating 14 is arranged in the optical path between the scale 13 and the non-polarization beam splitter 15, as shown in FIG. 4, the offset diffraction grating 14 may be arranged in the optical path between the non-polarization beam splitter 12 and the scale 13.

Second Embodiment

Figure 5:
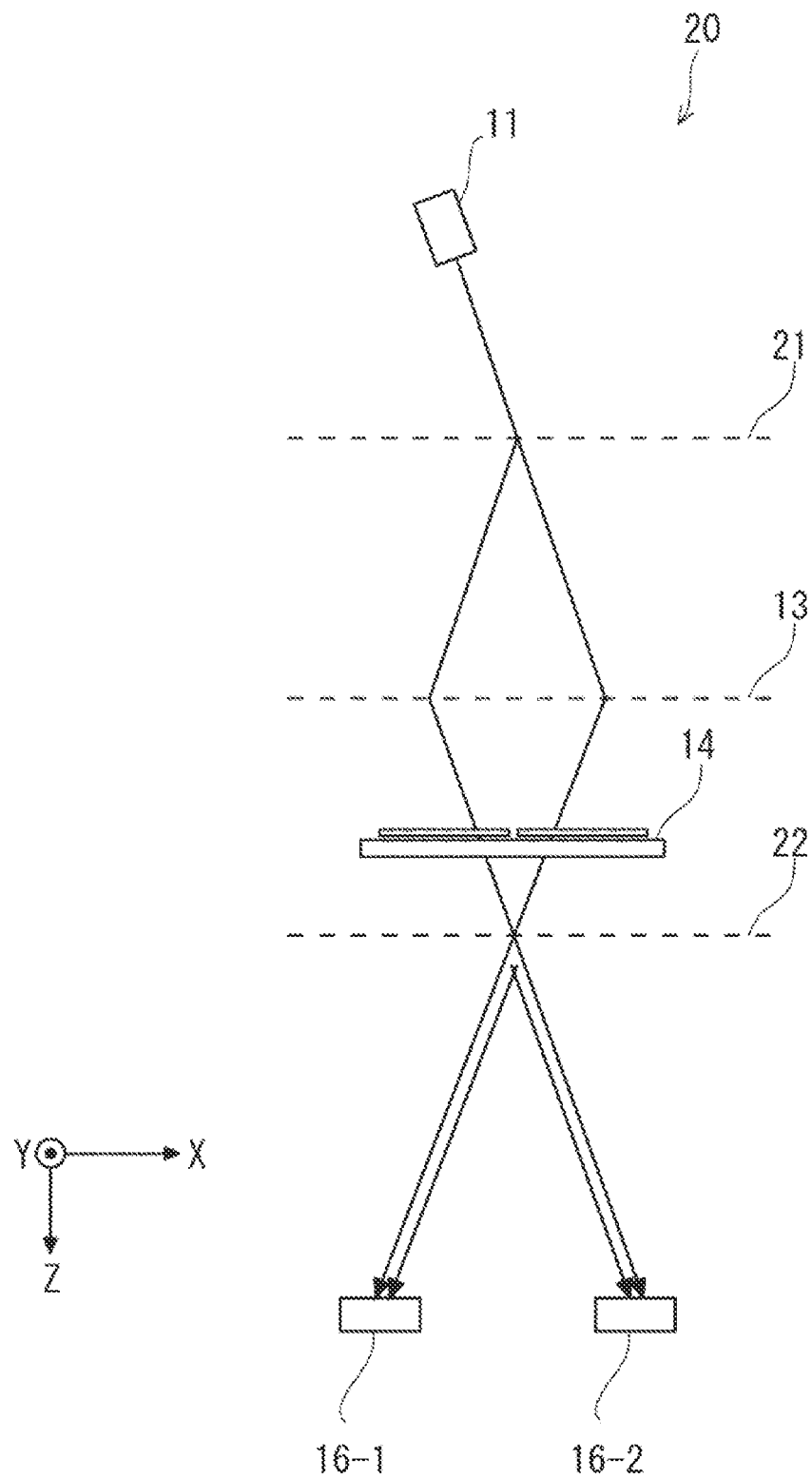
FIG. 5 is a top view schematically showing the optical portion of the optical encoder according to the second embodiment.

In a second embodiment, an example of using an index grating to split light is described. FIG. 5 is a top view schematically showing the optical portion of the optical encoder according to the second embodiment. In FIG. 5, the same configuration as that of FIG. 1 are indicated the same numerical sign and the description of that will be omitted.

In FIG. 5, an optical encoder 20 includes the light source 11, an index grating 21 (also referred to as a splitter), the scale 13, the offset diffraction grating 14, an index grating 22, and the light receiving unit 16-1 and 16-2.

The index grating 21 splits the light beam emitted from the light source 11 into two light beams. Generally, the index grating 21 causes the split two light beams to reach the scale 13 in phase. For example, the main surface of the index grating 21 is arranged in parallel on the main surface of the scale 13, the light source 11 is arranged so that the light beam from the light source 11 is incident on the main surface of the index grating 21 from an oblique direction, and thereby the split two light beams reach the scale 13 thorough equal distances.

Index grating 22 synthesizes between diffracted lights in the offset diffraction grating 14, and emits the synthesized light to receiving unit 16-1 and 16-2. For example, the main surface of the index grating 22 is arranged in parallel to the main surface of the scale 13.

Processing of the optical and electrical signals is same processing in the first embodiment processing except that non-polarization beam splitter 12 of the first embodiment is replaced with the index grating 21 and that the non-polarization beam splitter 15 is replaced by the index grating 22.

Figure 6:
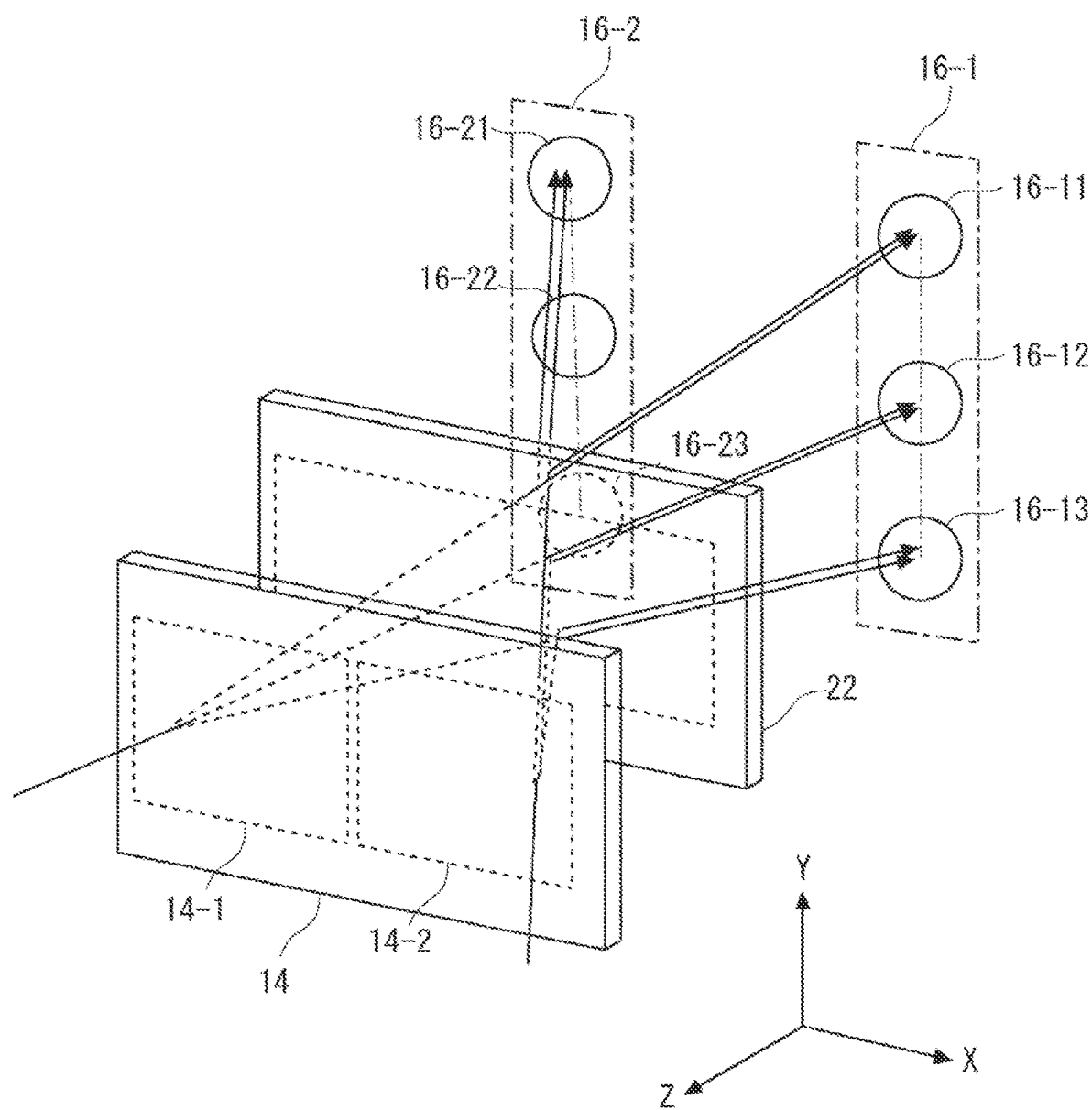
FIG. 6 is a perspective view showing the outline of a portion of the optical encoder according to the second embodiment.

In optical encoder 20 described in FIG. 5, the light receiving units 16-1 and 16-2 include a plurality of light receiving elements similarly to the optical encoder of the first embodiment. FIG. 6 is a perspective view showing the outline of a portion of the optical encoder according to the second embodiment.

The light receiving unit 16-1 has a configuration in which a plurality of light receiving elements 16-11, 16-12 and 16-13 are arranged in the offset direction. Also the light receiving unit 16-2 has a configuration in which a plurality of light receiving elements 16-21, 16-22 and 16-23 in the offset direction similarly to the light receiving unit 16-1.

As shown in FIG. 6, in the index grating 22, the light receiving elements 16-11 and 16-21 receive the interfering light synthesized between +1 order diffraction lights. Similarly, in the index grating 22, the light receiving elements 16-12 and 16-22 receive the interfering light synthesized between zero-order diffraction lights. In the index grating 22, the light receiving elements 16-13 and 16-23 receives the interfering light synthesized between −1 order diffracted lights.

Then, the light receiving elements 16-11 to 16-23 converts the intensity of each light into an electrical signal. Similarly to the first embodiment, the interfering light of the 0 order diffracted light has no phase shift due to the offset amount Δy of offset diffraction grating. Meanwhile, the interfering lights of the first order diffracted light have the phase shift due to the offset amount Δy of offset diffraction grating.

Thus, according to the optical encoder of the second embodiment, since the phase shift caused by the offset amount Δy in the diffracted light between the grating areas having an offset in the direction orthogonal to the measurement direction, there is no need to be limited the index grating the phase grating, and it is not necessary to design the grating parameters for providing the predetermined phase difference, so there is no constraints on designing the diffraction grating.

Further, the index gratings 21 and 22 are applicable either if the configuration capable of splitting light, amplitude grating such slits formed grating are also applicable.

Figure 7:
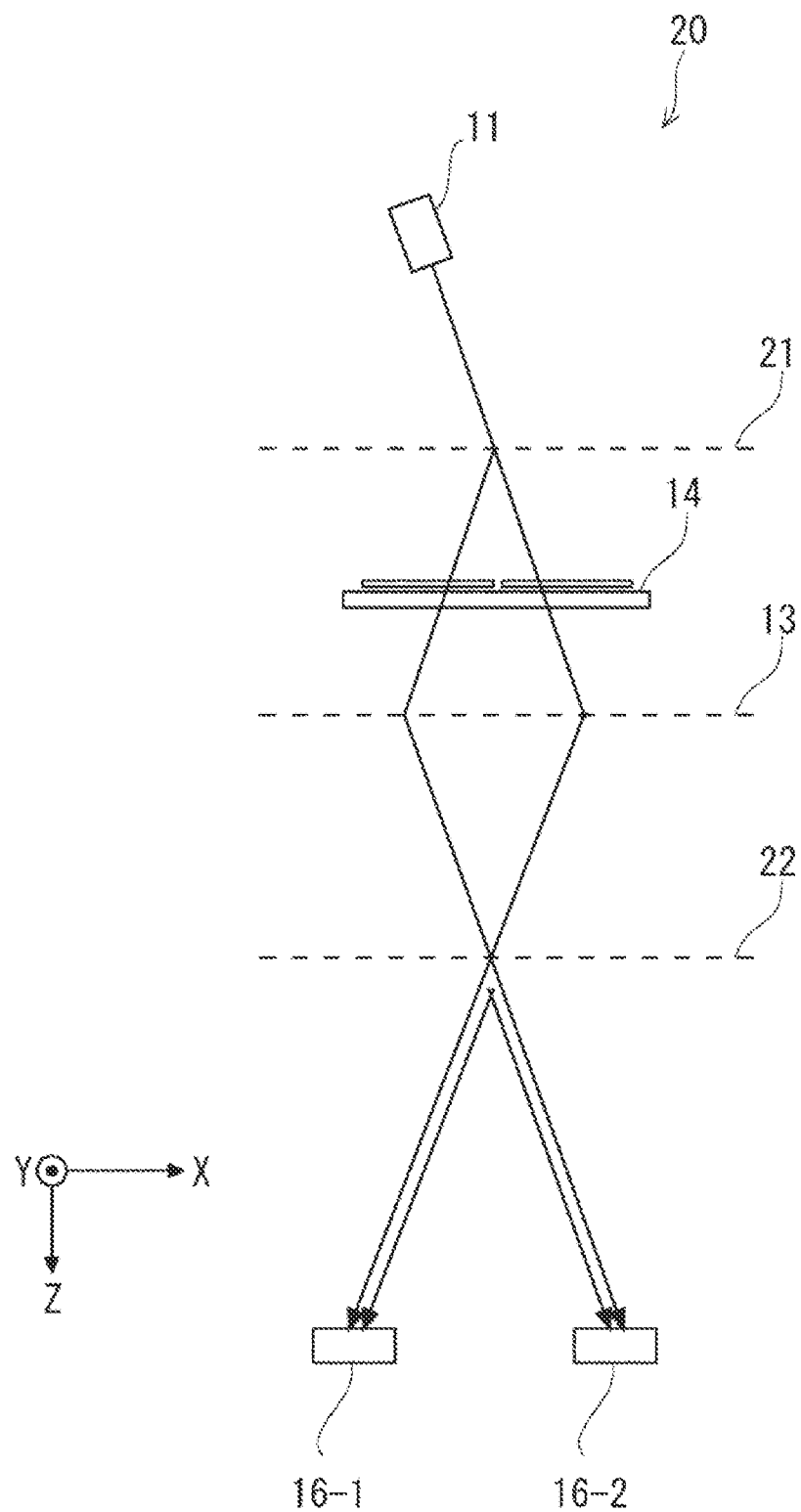
FIG. 7 is a top view showing an outline of an optical portion of the optical encoder according to the second embodiment.

The position to be arranged the offset diffraction grating may be any position where the optical path of each beam is split. In the present embodiment, the optical path between the index grating 21 to the index grating 22 corresponds to position where be arranged the offset diffraction grating. In the optical encoder of FIG. 5, although offset diffraction grating 14 are arranged in the optical path between the scale 13 and the index grating 22, also offset diffraction grating 14 may be arranged in the optical path between the index grating 21 and scale 13 as shown in FIG. 7.

Embodiment 3

Figure 8:
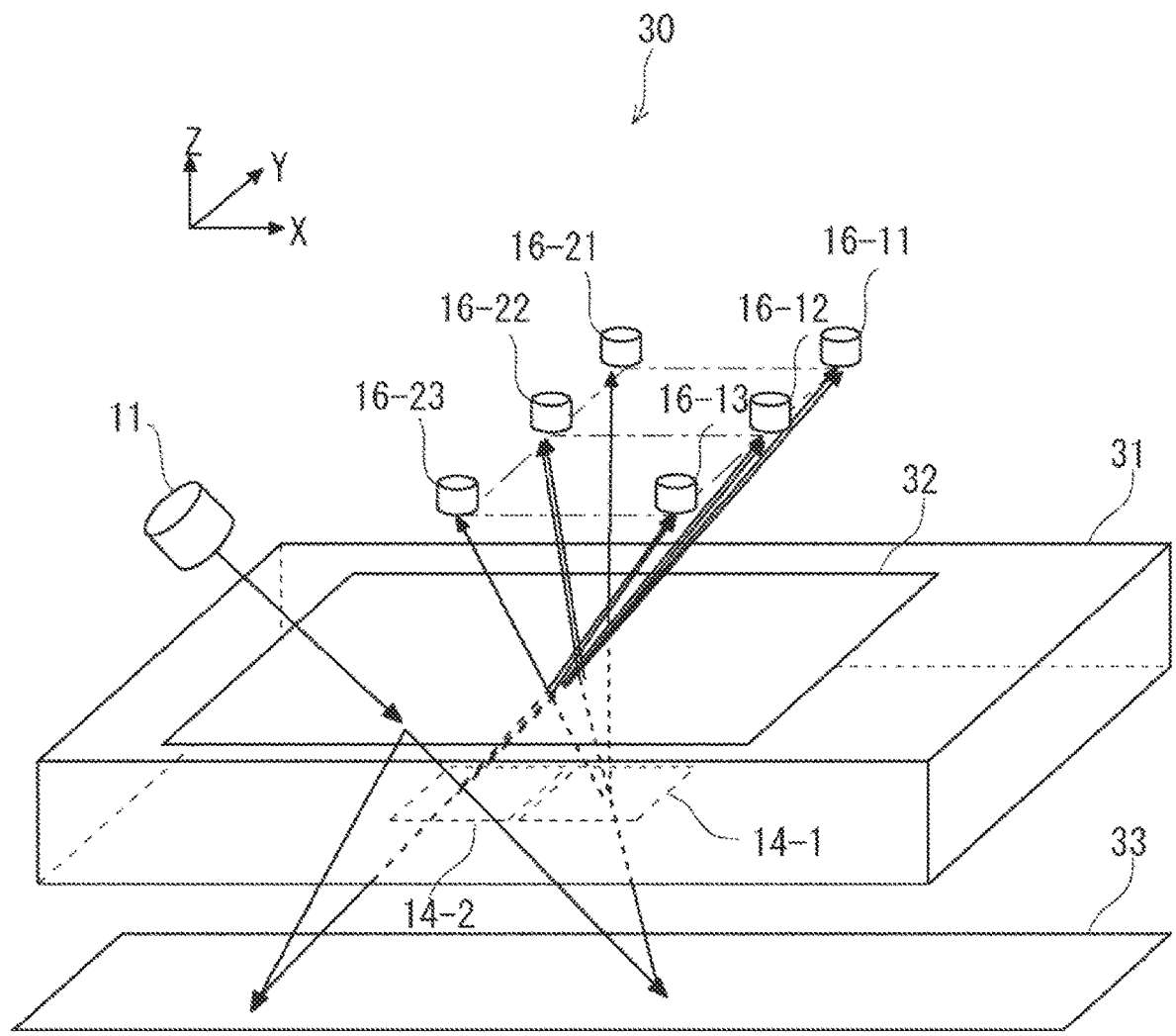
FIG. 8 is a perspective view showing an outline of an optical portion of the optical encoder according to the third embodiment.
Figure 9:
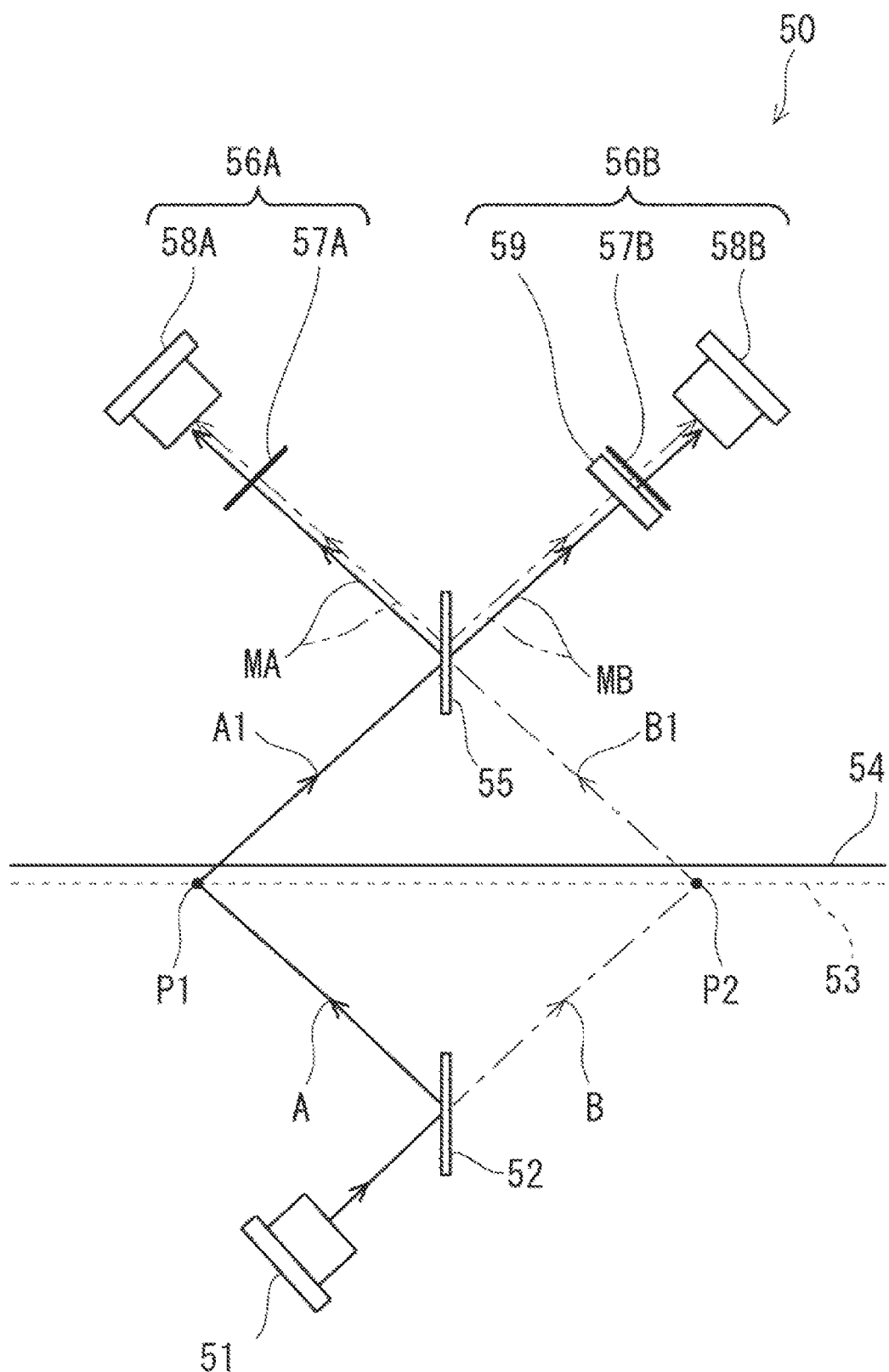
FIG. 9 is a diagram showing the configuration of a conventional optical encoder.
Figure 10:
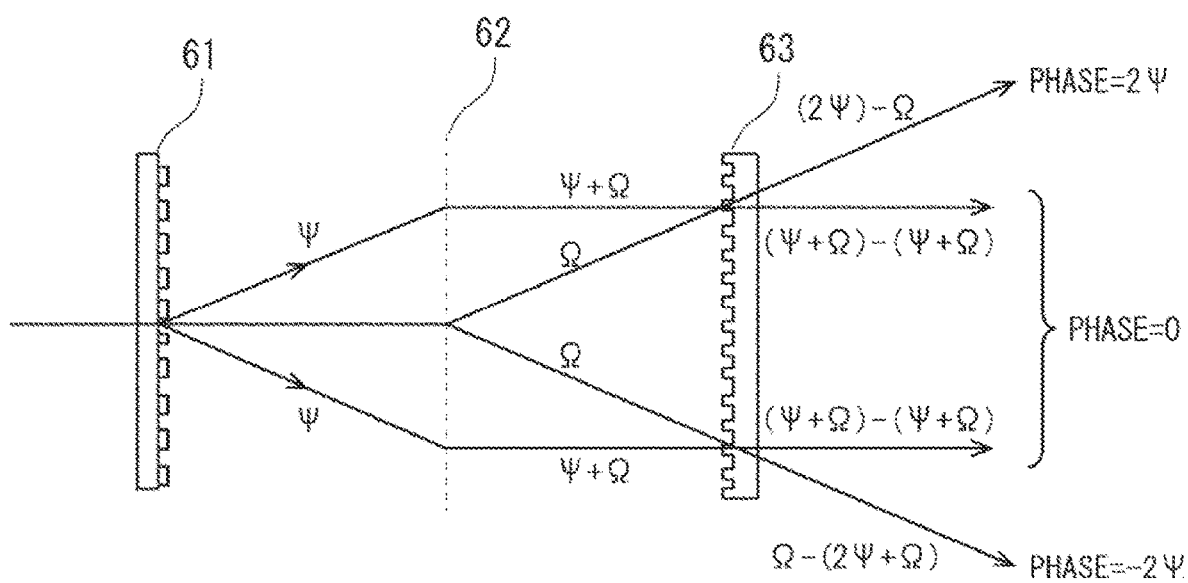
FIG. 10 is a diagram showing the configuration of a conventional optical encoder.
Figure 11:
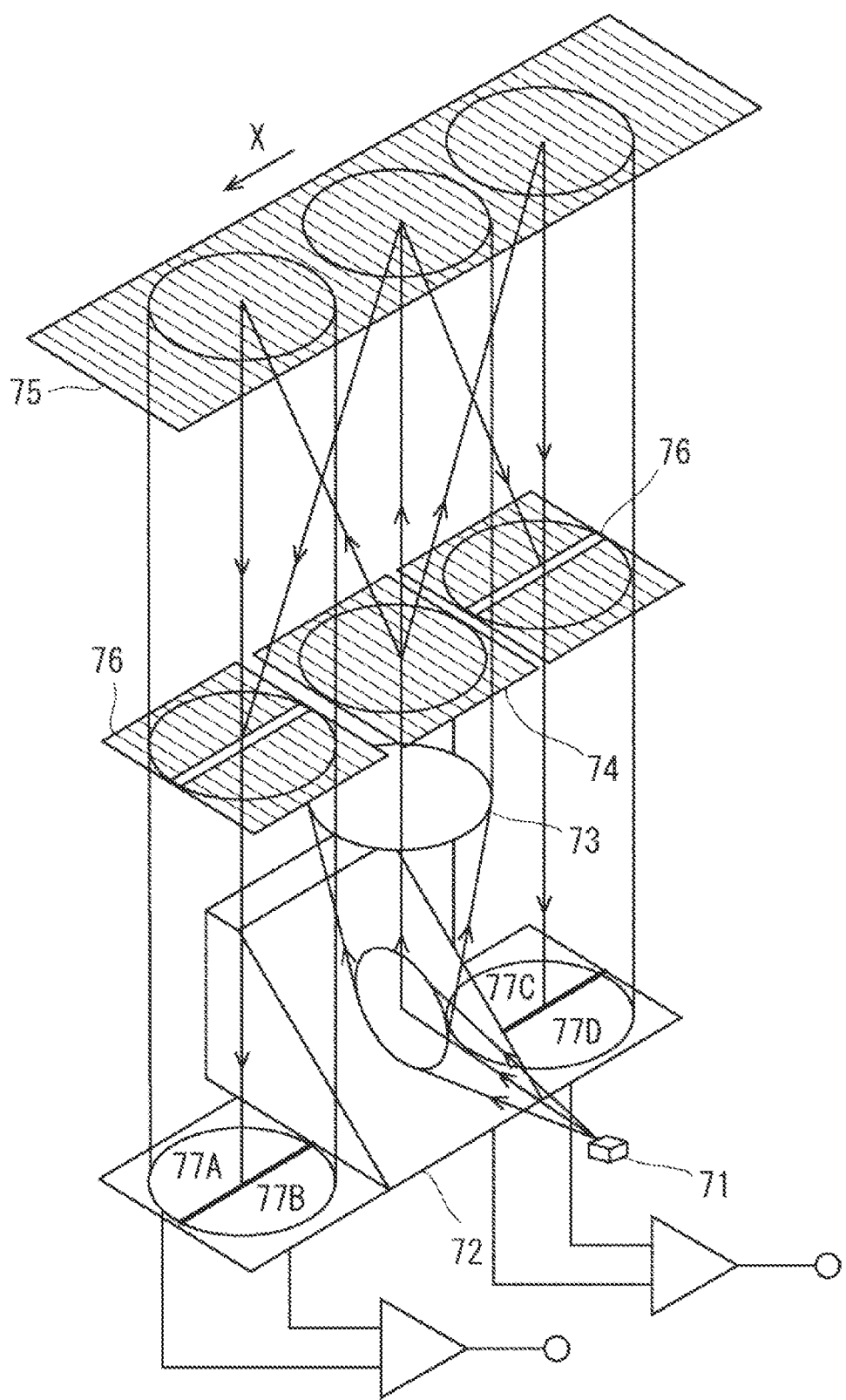
FIG. 11 is a diagram showing a configuration of a conventional optical encoder.
Figure 12:
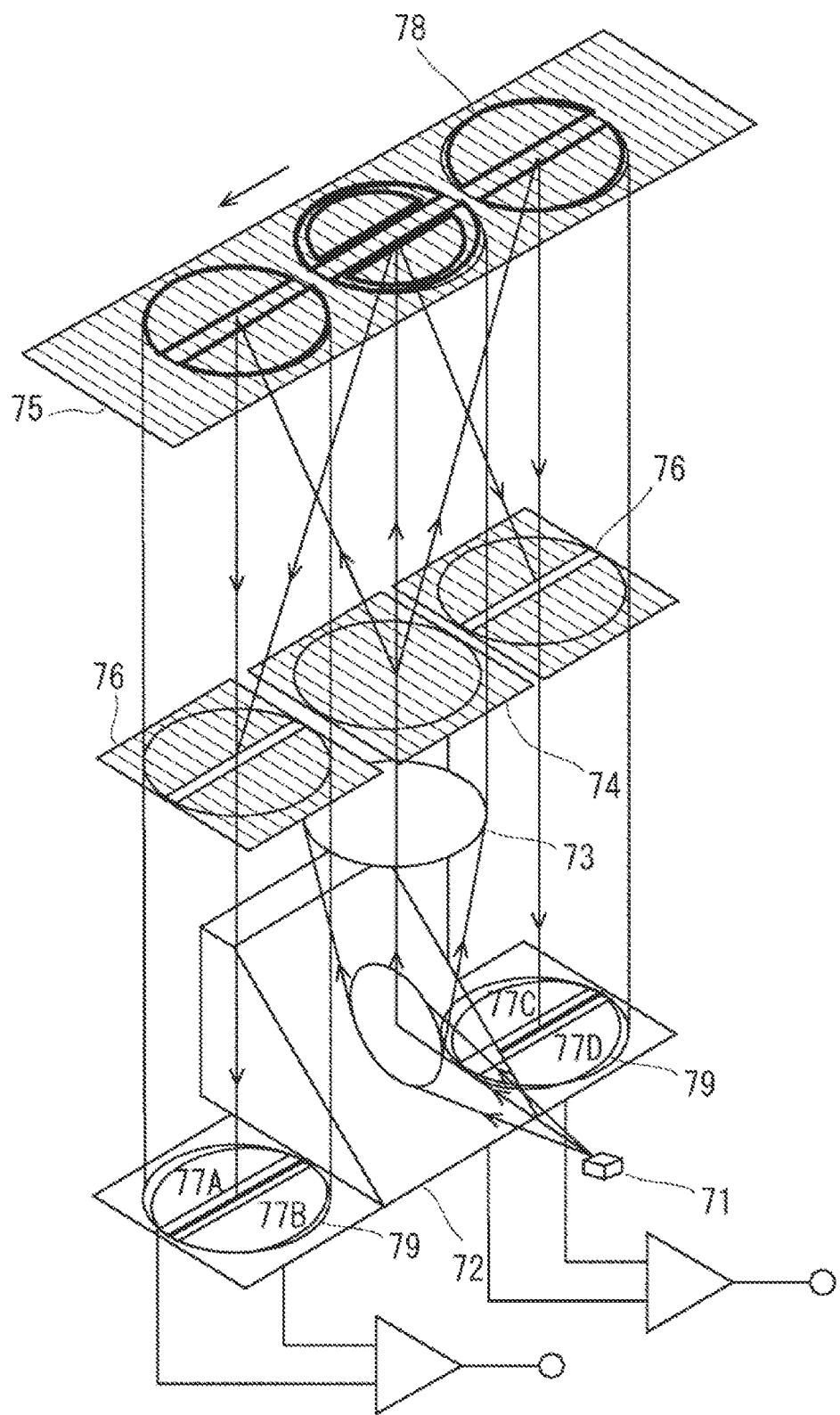
FIG. 12 is a diagram showing the configuration of a conventional optical encoder.
Figure 13:
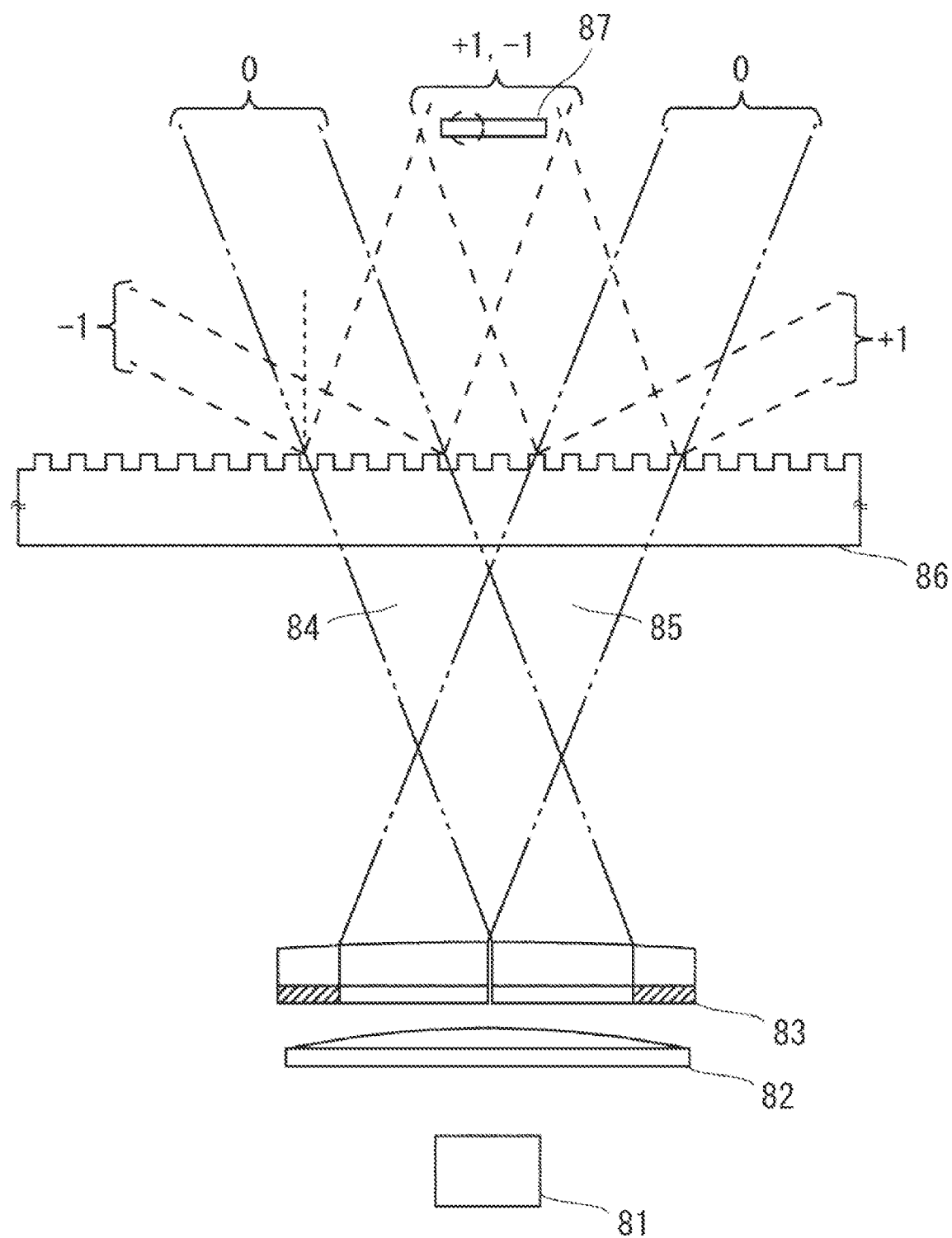
FIG. 13 is a diagram showing the configuration of a conventional optical encoder.

Also, in the optical encoder 20 of the second embodiment, the index grating 21 and the index grating 22 may have a common configuration. FIG. 8 is a perspective view showing an outline of an optical portion of the reflective optical encoder according to the third embodiment. In FIG. 8, the optical encoder 30 includes the light source 11, the glass substrate 31, the index grating 32, the scale 33, the offset diffraction grating 14-1, and receiving units 16-11 to 16-23.

Glass substrate 31 is a glass substrate having two parallel surfaces, the index grating 32 is formed on one side, and the offset diffraction grating 14-1 and 14-2 is formed on the other side. Further, the glass substrate 31 is made of a material for transmitting light incident from the light source 11.

Index grating 32 has a configuration corresponding to the index grating 21 and the index grating 22 in FIG. 5, and split the light beam emitted from the light source 11 into two light beams, and synthesizes between diffracted lights diffracted in the offset index grating that includes grating areas 14-1 and 14-2, and emits the synthesized light to receiving unit 16-1 and 16-2.

Scale 33 is the scale of the reflective type, and the scale 33 is obtained by forming a grating pattern on the material surface that reflects light such as steel. Scale 33 is displaced in the X-axis direction, the optical encoder 30 measures the displacement amount in the X-axis direction.

Offset diffraction grating 14-1 and 14-2 have a configuration corresponding to offset diffraction grating 14 of FIG. 1 or FIG. 5

In the optical encoder 30, light incident from the light source 11 is split into two beams in the index grating 32, and the light is transmitted through the glass substrate 31, and the light is reflected by the scale 33. Then, a reflected light is diffracted in the diffraction grating offset 14-1 and 14-2, and the reflected light is transmitted through the glass substrate 31, and the reflected light reaches to the index grating 32 again. And in the index grating 32, an interfering light that is synthesized between each other the diffracted light is measured in the light receiving units 16-11 to 16-23.

Thus, according to the optical encoder of the third embodiment, the index grating is formed on one surface of a glass substrate, the diffraction grating having an offset in the direction orthogonal to the measurement direction by forming the back surface of the glass substrate, a simple detection site can be implemented by a more small number of parts.

In the above embodiment, the offset diffraction grating has been described a configuration in which an offset between the two gratings may be configured to be offset between more than three gratings. In this case, it may be located on the main surface of the offset diffraction grating, and may be with the configuration to be offset in a direction orthogonal to the measurement direction. For example, it is also possible to form the optical system of the three-phase shifting the 2π/3 each phase between the three grids. In other words, it will offset in a direction perpendicular to the measurement direction only ⅓ of the grating width between the grids. It is ⅓ offset of the grid width between the gratings in a direction perpendicular to the positioning direction.

Also, each gratings and the scale can be any as long as it is a combination of a material comprising the opaque portions and light transmitting portions applications. In other words, may be used as the light transmitting portion to form a hole of the grid-shaped opaque glass, it may be formed an opaque portion to shield a portion of the transparent glass. Also it can be similarly applied to materials except of glass.

The present invention is not intended to limited to the above embodiments, and it is possible to appropriately be changed without departing from the scope. For example, the optical encoder of the present invention is not limited to the linear encoder, it can be applied to a rotary encoder.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical encoder comprising:
   a light source;
   a splitter that splits a light from the light source,
   a light receiving unit;
   a scale that is arranged on a light path and movable in a measurement direction, a grating being arranged on a main surface of the scale; and
   an offset diffraction grating that includes a plurality of diffraction grating patterns arranged in the optical path from the splitter to the light receiving unit, each of the plurality of diffraction grating patterns comprising a plurality of diffraction gratings diffracting the split lights with different phases, wherein,
   the plurality of diffraction gratings in the offset diffraction grating patterns are arranged in one plane parallel to the main surface of the scale, and the plurality of diffraction grating patterns are offset each other in an offset direction orthogonal to the measurement direction, and the light receiving unit includes a plurality of light-receiving elements arranged in the offset direction.

2. The optical encoder according to claim 1, wherein the splitter is a first non-polarization beam splitter, and the optical encoder comprises a second non-polarization beam splitter that is arranged in an optical path from the scale to the light receiving unit.

3. The optical encoder according to claim 2, wherein the offset diffraction grating is arranged in an optical path from the scale to the second non-polarization beam splitter.

4. The optical encoder according to claim 2, wherein the offset diffraction grating is arranged in an optical path from the first non-polarization beam splitter to the scale.

5. The optical encoder according to claim 1, wherein the splitter is an index grating.

6. The optical encoder according to claim 5, wherein the offset diffraction grating is arranged in an optical path from the scale to a site of the index grating that emits a light to the light receiving unit.

7. The optical encoder according to claim 5, wherein the offset diffraction grating is arranged in an optical path from a site of the index grating on which the light from the light source is incident to the scale.

8. The optical encoder according to claim 5, wherein the scale reflects a light.

9. The optical encoder according to claim 1, wherein the light receiving unit includes a plurality of rows in which the plurality of the light receiving elements are arranged in the offset direction; and the plurality of diffraction gratings in the offset diffraction grating are offset each other in the offset direction parallel to the main surface of the scale.

* * * * *